May 4, 1937.  F. P. HOSKER ET AL  2,079,408
AUTOMOBILE IDENTIFICATION TAG
Filed Jan. 13, 1936
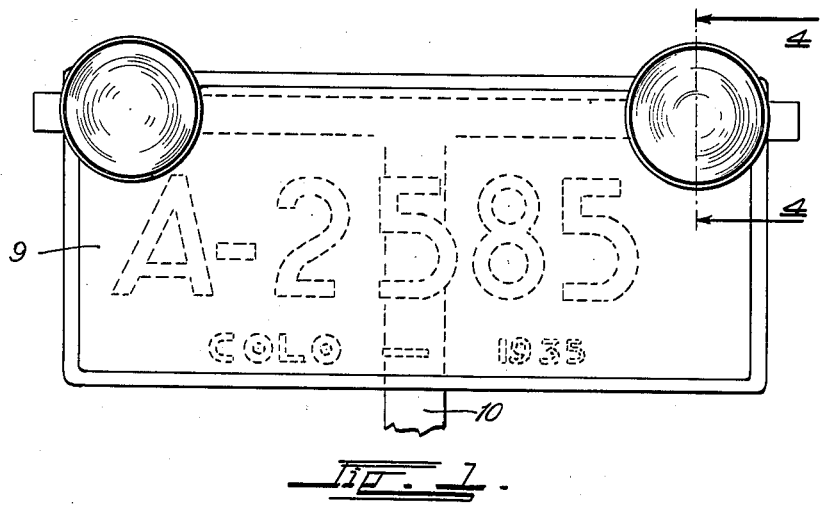
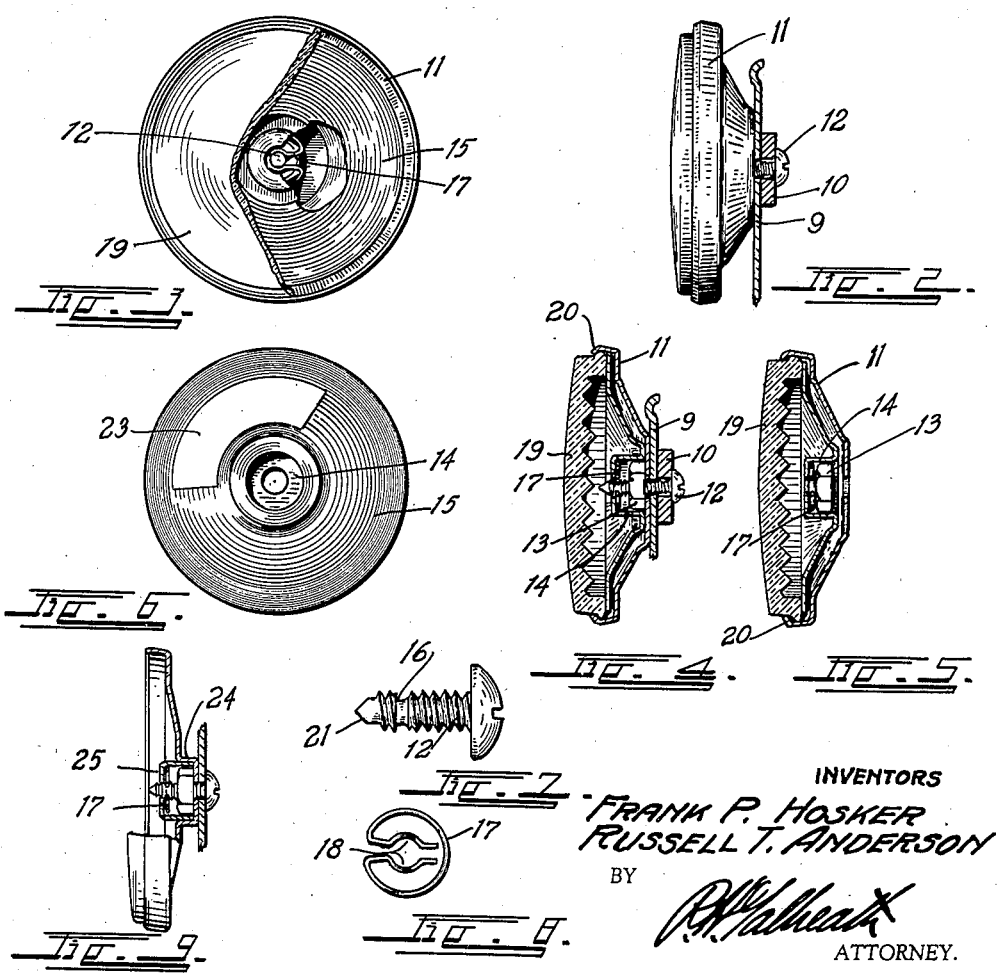
INVENTORS
FRANK P. HOSKER
RUSSELL T. ANDERSON
BY
ATTORNEY.

Patented May 4, 1937

2,079,408

UNITED STATES PATENT OFFICE 2,079,408

AUTOMOBILE IDENTIFICATION TAG

Frank P. Hosker and Russell T. Anderson, Denver, Colo.

Application January 13, 1936, Serial No. 58,908

5 Claims. (Cl. 40—125)

This invention relates to a self-locking automobile identification device. When an automobile is stolen, the thief usually immediately removes the license plates, and substitutes others to prevent identification of the automobile. There are no means by which police officers may quickly identify a suspicious car as being stolen, and no means of proving immediately that the license plates upon any suspicious car are not the ones originally intended for that car.

The principal object of this invention is to provide an identifying attachment device which may be used to attach the plates to a car so that said plates can not be removed from the car by an unauthorized person without destroying the attachment devices so that it will become immediately evident that the plates have been changed or tampered with.

Another object of the invention is to provide means for carrying identification of the ownership of an automobile which can not be removed, changed or tampered with without giving immediate indication of said tampering.

Another object of the invention is to combine with a self-indicating identification device, a rear reflecting member, so that it will serve both as an identification and as a reflector, and so that it will not be noticeable as an identification device.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 illustrates the invention as it would appear when employed for attaching an automobile license plate to its bracket.

Fig. 2 is a side view of the invention as employed for attaching a license plate to its bracket.

Fig. 3 is a face view partially broken away to show the interior construction.

Fig. 4 is a vertical section through the invention, taken on the line 4—4, Fig. 1, illustrating the device in the clamped and locked position.

Fig. 5 is a similar section illustrating the device as it would appear ready for use.

Fig. 6 is a detail rear view of the combined nut holder and reflector.

Fig. 7 is an enlarged view of the clamp screw.

Fig. 8 is an enlarged detail view of the locking spring.

Fig. 9 is a vertical section, illustrating an alternate method of constructing the invention.

In Fig. 1, a typical license plate is indicated at 10 with its supporting bracket at 11.

The invention may be made in any desired form. The preferred form is to manufacture it so that it may be used; first, as a self-locking clamp bolt for attachment of a license plate; second, as a carrier for identification material; and third, as a rear reflector. The embodiment illustrated accomplishes all three of these functions. It is conceivable, however, that if it is not desired to use it as a reflector, this portion of the device may be eliminated and, if it is not desired to use it for carrying identification material, this portion of the device may be eliminated. The basic feature of the device is to allow it to be tightly attached upon any suitable supporting member so that it cannot be removed without visible destruction.

In the modification illustrated, the device consists of a dished, sheet metal, outer housing 11, perforated at its back for the passage of a clamp screw 12. The housing 11 contains an inner disc 15 provided with a nut receiving depression 14 in which a clamping nut 13 is carried. In the bottom of the depression is an annular locking spring 17 consisting of a spring wire bent into a circle to snugly fit into the depression 14. The extremities of the wire are turned inwardly to form coacting locking members 18.

A reflecting lens 19 closes the front of the housing 11 when the nut 13 and the spring 17 are in place the lens is permanently positioned by rolling the edge of the housing about it as shown at 20, Fig. 5. It is impossible for anyone to then reach the nut 13 without first breaking the glass lens 17.

When used for attaching a license plate the clamp screw 12 is passed through the attachment bracket 11 and through the license plate 10. The screw is provided with a pointed extremity 21 which guides it into the back of the housing 11 and into the nut 13. As the screw 12 is tightened, the nut 13 will be held stationary by its frictional engagement with the sides of the nut socket 14. When its point has passed through the nut 13 it will enter between extremities 18 of the spring 17, which will snap into place in the groove 16.

The screw 12 can now be tightened to any desired tension. The friction of the nut against the back of the casing assists the frictional grip of the depression 14 to prevent the nut from turning.

Now let us assume that an unauthorized person attempts to unscrew the screw 12 in order to change license plates. He places the screw driver in the screw and starts to back it out of the nut 13. The first rotation loosens the frictional engagement of the nut with the back of the housing 11. The nut then travels toward the head of the screw until it strikes the stop spring 17, which will prevent it from further movement along the screw. Rotation of the screw now simply rotates the nut 13 in its socket 14 against the comparatively light-frictional engagement of the corners of the nut so that it will be impossible to further unscrew the screw 12. The only possible way to remove the device is to either cut the screw or break the lens so that the spring stop 17 may be removed and the nut held with the fingers.

Therefore, it can always be ascertained if the removal was unauthorized since the broken glass or cut screw will immediately indicate the tampering. If desired, an identification card such as indicated at 23 can be placed in the device so that should an officer desire to know if the owner of the car is driving it, he can break the glass and look at the identification card. If he finds the glass already broken, he will know that the driver is not the owner.

The disc 15 may be silvered to serve as a reflector or the back of the lens may be silvered for this purpose if desired.

In the form of Fig. 9, the disc 15 has been omitted. In this form, the back of the housing is indented to form a receiving socket 24 into which a nut receiving cup 25 is forced after the nut and the spring 17 are in place therein. This form acts exactly similar to the previous described form. The cup 25 acting to hold the nut from rotating until it has been backed against the stop spring 17.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. An attachment device for automobile identification means comprising: a housing; a glass face closing said housing; a nut receiving cup formed in said housing; a nut frictionally engaged in said receiving cup; a spring stop member in said cup behind said nut; and an attachment screw adapted to be threaded through said housing into said nut, said attachment screw having means engageable by said stop member for preventing said screw from being unscrewed through said nut.

2. An identification tag for automobiles comprising: a housing; a glass front in said housing; a nut receiving cup positioned back of said glass front; a nut frictionally engaged within said cup; a spring member positioned adjacent said nut; and an attachment screw adapted to be passed into said housing through said nut and provided with a groove for engaging said spring member to prevent return movement of said screw.

3. An identification tag comprising: a circular cup-shaped housing; a glass front in said housing; a depression in the rear of said housing; a nut retained in said depression; an attachment screw threaded into said nut; and means adjacent said nut for engaging and preventing removal of said screw, said depression acting to prevent rotation of said nut as the screw is threaded into the latter, but allowing rotation thereof when removal of said screw is attempted.

4. An identification tag for automobiles comprising: a cup-shaped housing; a glass front in said housing; a reflector member positioned back of said glass front; a depression formed in said reflector member; a nut carried in said depression, there being an opening in said housing for passing an attachment screw into said nut.

5. An identification tag for automobiles comprising: a cup-shaped housing; a glass front in said housing; a reflector member positioned back of said glass front; a depression formed in said reflector member; a nut carried in said depression, there being an opening in said housing for passing an attachment screw into said nut; and means in the bottom of said depression for engaging said screw and preventing its return through said nut, the sides of said depression engaging said nut sufficiently to prevent easy rotation thereof but to allow rotation thereof should extreme removal movement be applied to said attachment screw.

FRANK P. HOSKER.
RUSSELL T. ANDERSON.